D. Lee,
Steam Trap.

N° 27,914.        Patented Apr. 17, 1860.

Witnesses:                Inventor:
R. H. Eddy                Daniel Lee

UNITED STATES PATENT OFFICE.

DANIEL LEE, OF BOSTON, MASSACHUSETTS.

STEAM-TRAP.

Specification of Letters Patent No. 27,914, dated April 17, 1860.

*To all whom it may concern:*

Be it known that I, DANIEL LEE, of Boston, in the county of Suffolk and State of Massachusetts, have invented an Improved Steam-Trap; and I do hereby declare the same to be fully described and represented in the following specification and the accompanying drawings, of which—

Figure 1:
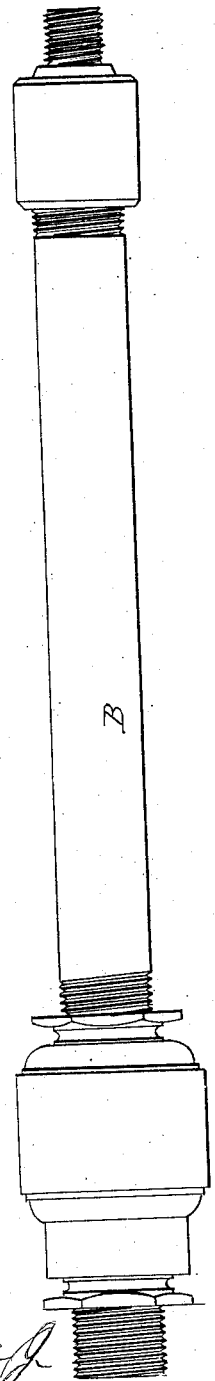
Figure 2:
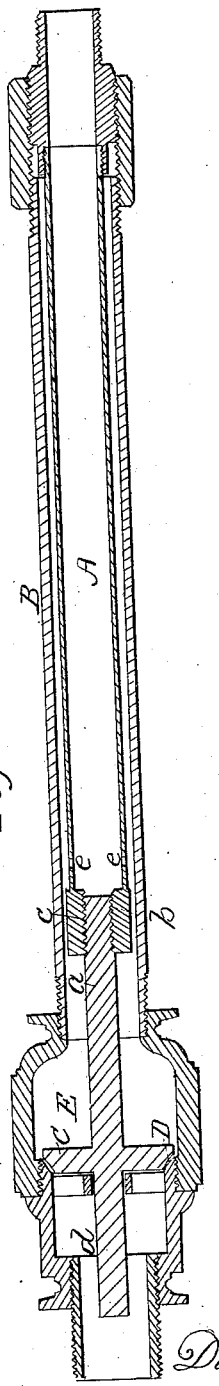

Figure 1, is an external view, and Fig. 2, a longitudinal section of it.

In the drawings, A is an expansion tube or "expander" which is placed within another tube or case, B, and with one end fastened to one end of such case and the other end left free.

In making my invention, I prefer to have the expander made of copper, brass, or some metal or composition of metals having a greater degree or ratio of expansion than the metal of which the case or tube, B, may be composed, and which may be iron.

The stem, *a*, of the puppet valve, C, is arranged in line with the axis of the expansion tube, A, and is provided with a male screw, *b*, to screw into the upper end of the said expander in order to connect it with the valve and enable the latter to be adjusted with reference to its seat and the expander. The valve seat, D, is shown as arranged at the outer end of a valve box or chamber, E, which is joined to the tube or case B, and so that the valve seat may be somewhat beyond the expander whose adjacent end is closed except in being formed with a female screw *c*, to receive the screw of the valve stem. Near to the said end of the expander one or more holes or orifices, *e, e*, are made through the sides of the expander and so as to open communication between it and the interior of the case, B. Furthermore, that end of the tube A, which is fastened to the tube, B, should be connected with the condenser to which the steam trap is to be applied. The valve box beyond the valve may be open as shown at, *d*, or it may be connected with a conduit for carrying off the condensed water that may escape through the valve seat.

When steam is employed in pipes for heating the apartments of a building, its condensation within them is often a source of much annoyance, and unless some means be provided, by which the condensed water may be readily discharged from the heat radiating pipes or vessels without at the same time creating a loss of steam, its accumulation therein may lead to serious or injurious consequences.

My invention is intended to be applied to such heat radiating devices, and for the purpose of extracting the condensed water from them and preventing at the same time, the escape of steam.

While in operation, the trap is to be so arranged that the condensed water as well as the steam may flow from the radiating pipes or radiator into the expander. While steam may be within or around the expander, the valve should be closed upon its seat, so as to prevent the escape of any of the steam through the opening of the seat. As the condensed water may accumulate within the apparatus, it will cause the temperature of the expander, A, to wall, in which case, the expander will contract longitudinally and draw the valve away from or off its seat and permit the condensed water to be driven out of the apparatus. This water being displaced by steam, the temperature of the expander will be raised so as to cause the valve to return to its seat. Thus, the water will be discharged and the steam be entrapped or be kept from being wasted.

The mode of applying the valve stem, *a*, to the expander enables the valve to be readily adjusted to its seat under any of the ordinary atmospheric changes of temperature.

I make no claim broadly to the application in an air trap of a valve to operate by expansion and contraction under changes of temperature: nor do I claim an air or steam trap composed of a valve or expander of hard valcanized india rubber and constructed and applied in a tube and to operate against two valve seats situated at opposite ends of such tube as shown in the United States Patent, numbered 27313.

With my invention I employ but one valve seat and a tubular expander stationary at one end, having lateral passages or openings and provided with a single valve. By so making the expander, I am able not only to obtain one, very thin and susceptible to the heat of the steam but one in which the steam can act both within and around it at one and the same time, and so as to present a much larger surface than were it applied only to the external surface of the expander.

When the expander is a solid cylinder or rod either of metal or hard india rubber, it will readily be seen that the time required for it to expand the requisite distance under any given change of temperature must be longer than if made tubular so that the heat can be applied both within and without it and against surfaces which are close together so as to have a thin stratum or thickness of material for absorption of the heat.

In the operation of an air or steam trap, a sensitive expander is a matter of great importance, otherwise a considerable waste of steam must follow. Furthermore, a metal expander is preferable to one made of india rubber, as the latter, particularly if used in a horizontal position and under steam of high temperature would be liable to be either melted or curved out of shape, whereas, the metallic expander is capable of withstanding superheated steam of any ordinary temperature.

I claim—

1. My improved steam trap expander as made tubular or hollow and with one or more lateral openings, $e$.

2. I also claim my improved mode of arranging or combining the tubular expander with its valve and case, viz, by having the expander at or near one end of it, fastened to and opening through one end of the case while at its other end, it is connected with the valve, C.

3. I also claim making the valve, C, separate from the expander and applying the two together by adjusting screws $b$, $c$, as described.

DANIEL LEE.

Witnesses:
R. H. EDDY,
F. P. HALE, Jr.